3 Sheets--Sheet 1.

W. B. FRANKLIN & C. B. RICHARDS.
Carriage for Field Guns.

No. 161,219. Patented March 23, 1875.

Witnesses:
C. V. Forbes
J. H. Shumway

Wm. B. Franklin & Chas. B. Richards
Inventors.
By Atty. John E. Earle

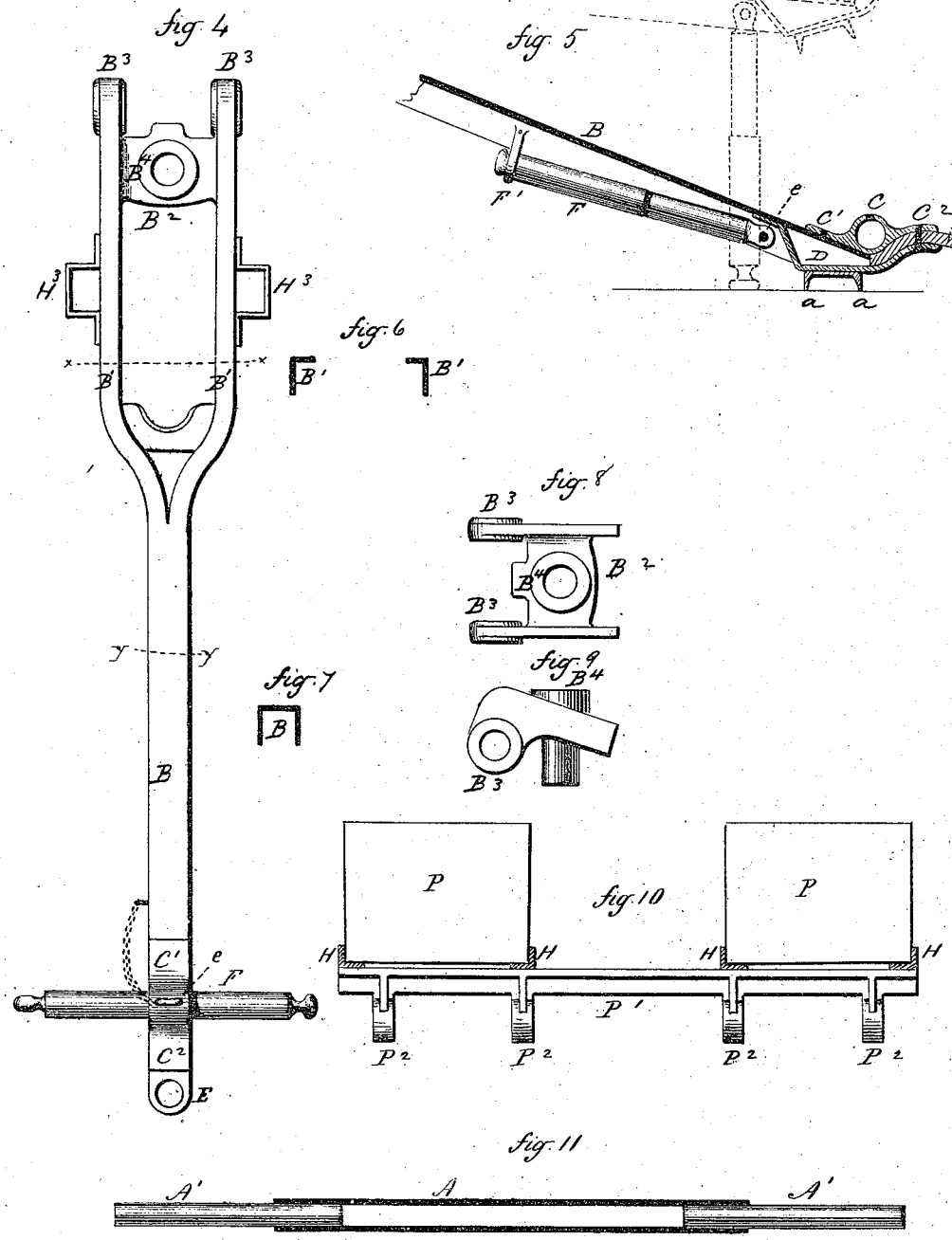

3 Sheets—Sheet 3.
W. B. FRANKLIN & C. B. RICHARDS.
Carriage for Field Guns.
No. 161,219. Patented March 23, 1875.
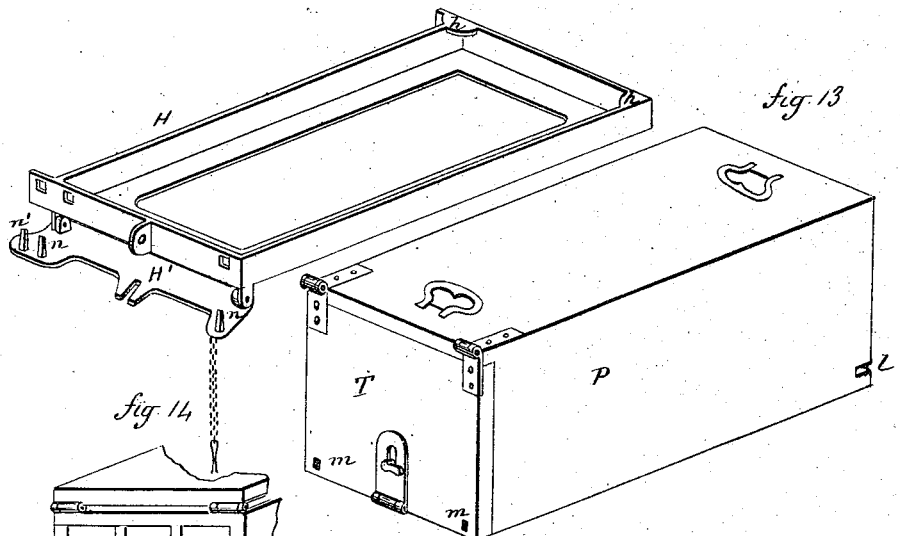
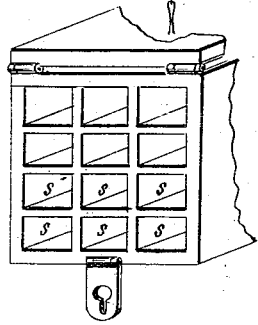
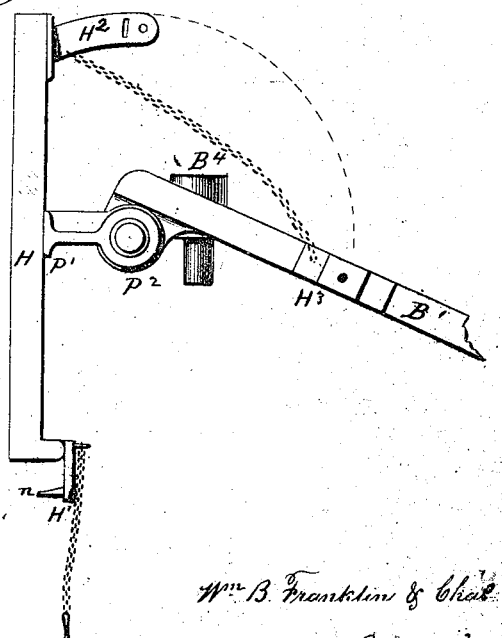

UNITED STATES PATENT OFFICE.

WILLIAM B. FRANKLIN AND CHARLES B. RICHARDS, OF HARTFORD, CONNECTICUT, ASSIGNORS TO COLT'S PATENT FIRE-ARMS MANUFACTURING COMPANY, OF SAME PLACE.

IMPROVEMENT IN CARRIAGES FOR FIELD-GUNS.

Specification forming part of Letters Patent No. 161,219, dated March 23, 1875; application filed January 7, 1875.

*To all whom it may concern:*

Be it known that we, WM. B. FRANKLIN and CHARLES B. RICHARDS, of Hartford, in the county of Hartford and State of Connecticut, have invented a new Improvement in Gun-Carriage; and we do hereby declare the following, when taken in connection with the accompanying drawings and the letters of reference marked thereon, to be a full, clear, and exact description of the same, and which said drawings constitute part of this specification, and represent, in—

Figure 1:
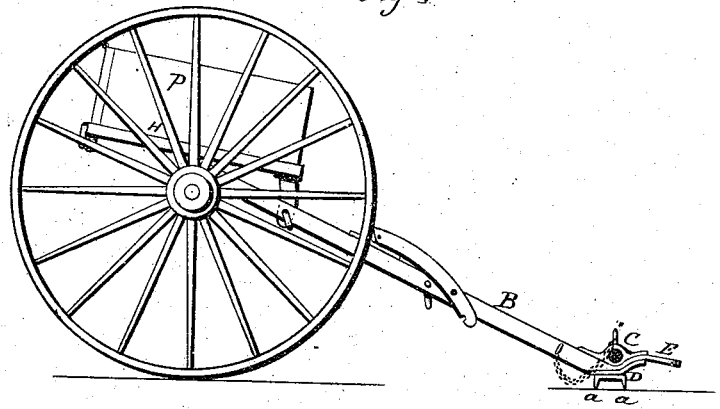
Figure 2:
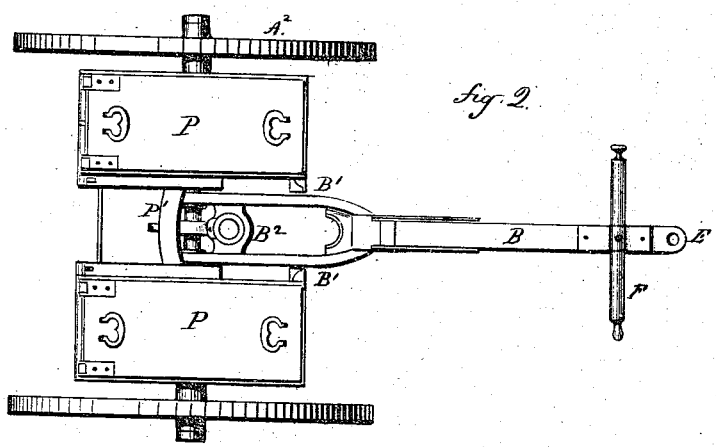
Figure 3:
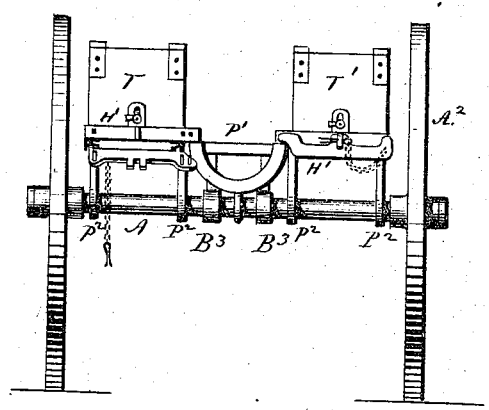

Figure 1, Sheet 1, a side view; Fig. 2, a top or plan view; Fig. 3, a rear view; Figs. 4 to 11, inclusive, Sheet 2, detached views to illustrate the details of construction; Figs. 12 to 15, inclusive, Sheet 3, the caisson and its attachment to the carriage.

This invention relates to an improvement in carriage for mounting the Gatling or similar guns, and parts of which are applicable to carriages for other classes of guns, the object being to produce a strong, light, durable, and convenient carriage; and the invention consists generally in the details of construction, as hereinafter fully set forth, whereby the carriage is composed principally of light wrought metal; also, in the arrangement of the frame supporting the caissons, whereby they are turned back out of the way for the convenient working of the gun; also, in constructing the caisson with independent pockets for the cartridge-cases.

The axle on which the apparatus is mounted is constructed as seen in Fig. 11. This consists of a wrought-metal tube, A, in length substantially the distance between the wheels, and at each end an arm, A¹, welded, brazed, or otherwise practically made a part of the axle. To these arms the wheels A² are fitted in the usual manner. This produces a light and strong axle, and of cylindrical form, desirable for the convenience of mounting the other parts of the carriage, as hereinafter described. B, the trail. (Seen detached in Fig. 4.) This is made from inverted ⊔-shaped iron, (see section, Fig. 7,) and toward the axle is divided, and the two parts B¹ B¹ spread to form a bifurcated frame, (see Fig. 6,) reaching to the axle. At the axle-end of this bifurcated frame the two parts B¹ B¹ are united by an intermediate piece, B². (Seen in Figs. 8 and 9.) This piece B² is formed with ears B³, perforated to pass on over the cylindrical axle, and form the attachment of the bifurcated frame with the axle. Preferably this attachment of the frame B¹ with the axle is made so as to prevent the axle from turning in the ears. In this piece B² the socket B⁴ is formed to receive the pintle of the gun, but at such an angle to the frame that, when the trail is down, the socket will be vertical, or nearly so, as seen in Fig. 9.

The tip of the trail, which must be provided with a hand-bar, and with means for attaching it to the limber, is constructed, as seen in Fig. 5. A transverse socket, C, is constructed with a flange, C¹, extending back upon the top of the trail, and a similar flange, C², forward. Beneath this socket C a shoe, D, forms the under termination of the trail, and is preferably provided with spurs *a*. The forward end of the shoe extends upward, as at *d*, and between this forward end *d* of the shoe and the flange C² of the socket C, the loop E, or device for attaching to the limber, is introduced, and all these parts secured together, as seen in Fig. 5, to form the complete tip for the trail. F is the hand-bar, constructed to pass freely into the socket C, and is there secured by a pin, *e*, or otherwise, but so as to be easily removed by withdrawing the pin *e*. This hand-bar, when not required in the socket, is removed and suspended within the trail, the rear end lying in the loop F', and the forward end secured by passing the same pin *e* transversely through the trail and bar, as seen in Fig. 5. Here the bar serves a second purpose—that is, as a support for the trail when it is raised, as denoted in broken lines, Fig. 5. This is done by freeing the rear end of the bar from the loop, and allowing it to fall into a perpendicular position from the securing-pin *e*.

The frame or body H for the caisson is made of L-shaped or angle iron—one of the frames seen in perspective, Fig. 12, the interior of the frame corresponding to the size of the caisson, so that the caisson will set within the angle upon one side of the L, the other side of the L extending up around the box P, as seen in Fig. 10. These frames are arranged on a bar, P¹, over the axle, the said bar P¹ provided with ears P², perforated so as to pass freely onto the cylindrical axle, as seen in Fig. 15, so that the frames may be turned down backward, as denoted in Fig. 15, or brought into a horizontal position, as seen in broken lines, same figure, and in Fig. 1. When turned up, the frames H are secured in that position by connection with the trail through an arm, H², into a socket, H³, as seen in Fig. 1; but as in that position they would interfere with the working of the gun, they are, when in use, turned down backward, as in Fig. 15, a chain or equivalent stop holding them in that position forward of the gunner, where, if the frame be covered, they will afford a shield for the protection of the gunner. The frames H are constructed with inwardly-projecting lugs $h$, and the caisson with corresponding recesses or notches $l$, (see Fig. 12,) so that when the caisson is set into its frame these notches $l$ will pass onto the lugs $h$, and thus prevent that end of the caisson from lifting out. At the other end of the frame a bar, H¹, is hinged to the frame so as to be turned up against the caisson, and provided with projecting studs $n$ to enter corresponding cavities $m$ in the caisson, and the bar H¹, secured in that position, securely holds the caisson in its frame until the bar H¹ be turned away.

By constructing the inner side of each frame of ⌐-shaped iron, and arranging the two frames distant from each other equal to the width of the caisson, as seen in Fig. 10, a third caisson may be set between the two outside caissons when the gun is removed, and this third caisson secured in like manner as the others, the hinged bars H' extending inward, and provided with an additional stud, $n'$, as seen in Fig. 12, for this purpose. These frames, which, by the peculiar shape of the metal of which they are constructed, are extremely light and strong, by that same peculiar shape produce a secure seat for the caissons.

In the use of the Gatling and similar guns, the cartridges are placed in receivers or boxes as a convenient means for supplying the gun. These boxes or receivers are first filled, and then placed in the caissons to be successively taken therefrom and placed upon the gun to supply cartridges thereto. It is essential that these boxes should be held firmly, or nearly so, in the caisson, and prevented from contact with each other. To do this we construct the caisson with independent pockets S, as seen in Fig. 14, each pocket corresponding to, or so as to receive, a single cartridge-box, and the caisson closed by an end door, T, which, when open, exposes the pockets for the introduction or removal of the cartridge-boxes.

We claim as our invention, and desire to receive by Letters Patent—

1. The trail of a gun-carriage, constructed from ⌐-shaped wrought metal, substantially as described, and combined with a tip and means for attachment to the axle of the carriage.

2. In combination with the trail and axle of a gun-carriage, the piece B, constructed to form the socket B⁴ and ears B³, substantially as and for the purpose described.

3. The tip for the trail, consisting of the transverse socket C, the shoe D, and the loop E, constructed substantially as described.

4. The hand-bar F, removably arranged in a recess beneath the trail, substantially as and for the purpose described.

5. A gun-carriage caisson-frame, constructed from angle or L-shaped metal, arranged in the manner described, to receive and secure the caisson, substantially as described.

6. The bar P¹, constructed with ears P² for attachment to the axle, combined with frames fixed thereon for the support of the caissons, substantially as described.

7. In a gun-carriage, the arrangement of the caisson-frame to be turned down forward of the pintle of the gun, substantially as described.

8. In a gun-carriage, the arrangement of the caisson-frame to be turned down forward of the pintle of the gun, combined with means, substantially as described, for holding said frame when so turned down forward, and to the trail when returned.

9. The combination of the frame for supporting the caisson P, and the hinged bar H' provided with stud or studs $n$, substantially as described.

10. A gun-carriage caisson, constructed with longitudinal pockets opening to the end of the caisson, substantially as described.

W. B. FRANKLIN.
C. B. RICHARDS.

Witnesses:
HENRY C. ROBINSON,
W. F. HENNEY.